United States Patent [19]

Harney

[11] 3,789,131

[45] Jan. 29, 1974

[54] SELECTIVE CODING SYSTEM FOR SUBSCRIPTION TELEVISION

[75] Inventor: Ralph P. Harney, Wonder Lake, Ill.

[73] Assignee: Oak Industries Inc., Crystal Lake, Ill.

[22] Filed: Aug. 3, 1972

[21] Appl. No.: 277,790

[52] U.S. Cl. .................................... 178/5.1, 325/34

[51] Int. Cl. ............................................ H04n 1/44

[58] Field of Search ......................... 178/5.1; 325/34

[56] References Cited

UNITED STATES PATENTS

| | | | |
|---|---|---|---|
| 3,668,307 | 6/1972 | Face et al. | 325/308 |
| 3,684,823 | 8/1972 | McVoy | 178/5.1 |
| 3,733,431 | 5/1973 | Kirk, Jr. et al. | 178/5.1 |
| 3,716,654 | 2/1973 | Hendrickson et al. | 178/5.1 |
| 3,054,857 | 9/1962 | Weiss | 178/5.1 |
| 2,619,530 | 11/1952 | Roschke | 178/5.1 |

*Primary Examiner*—Maynard R. Wilbur
*Assistant Examiner*—S. C. Buczinski
*Attorney, Agent, or Firm*—Parker, Plyer & McEachran

[57] ABSTRACT

A system for coding and decoding television signals in a subscription television system provides means for alternately switching a television signal between channels at a transmitting center and for providing channel switching signals simultaneously therewith to each subscriber location to coordinate channel switching at the subscriber locations. Prior to channel switching, those subscribers to receive the subscription program receive an enabling signal so that the chennel switching signals will only be effective to control channel switching at the selected subscriber locations.

12 Claims, 2 Drawing Figures

SELECTIVE CODING SYSTEM FOR SUBSCRIPTION TELEVISION

SUMMARY OF THE INVENTION

The present invention relates to a subscription television system and in particular to means for providing security of the transmitted signal so that only selected subscribers may receive the same.

A primary purpose of the invention is a subscriber television system in which a television signal is switched between channels on a periodic basis with control signals being sent out from the transmitting center when switching takes place.

Another purpose is a subscription television system of the type described in which authorization signals are sent to place each selected subscriber in an authorization mode prior to the receipt of the channel switching signals.

Another purpose is a method of transmitting subscriber television signals in which a television signal is switched between channels at periodic intervals, with the switching at the transmitting center being accompanied by a switching signal effective at each of the selected subscriber locations.

Another purpose is a reliably operable subscription television system in which a television signal is switched between selected channels on a periodic basis.

Another purpose is a subscriber television system in which authorization signals, one for each subscriber location, are sent out prior to channel switching, with the authorization signals placing the selected subscriber locations in a condition to receive the subsequent channel switching signals.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The invention uses periodic switching of a television signal between channels to maintain security in a television subscription system. Channel switching takes place during the vertical blanking interval of the video signal to avoid interference. The system is described in connection with a cable subscription operation, although the invention should not be so limited.

Switching is controlled, at the transmitting center and at each subscriber location by digital signals which are transmitted in messages of predetermined length from the transmitting center to each subscriber location. These digital signals are transmitted at a carrier frequency different from the transmitted television signals. The system uses two different modes of operation. In the authorization mode, channel switching is not permitted, but each of the selected subscriber locations are placed in a condition to receive the channel switching signals. Using 20-bit messages at a transmission rate of 100,000 bits per second, it is possible to have an authorization cycle of four seconds duration which will cover 16,000 subscribers. After the authorization cycle in which those subscribers which are to receive the subscription program have been placed in an enabled condition, channel switching signals or channel switching commands are transmitted at periodic intervals and only those subscribers who have been placed in an enabled condition can correctly interpret the control signals and therefore will receive the appropriate programming.

Figure 1:
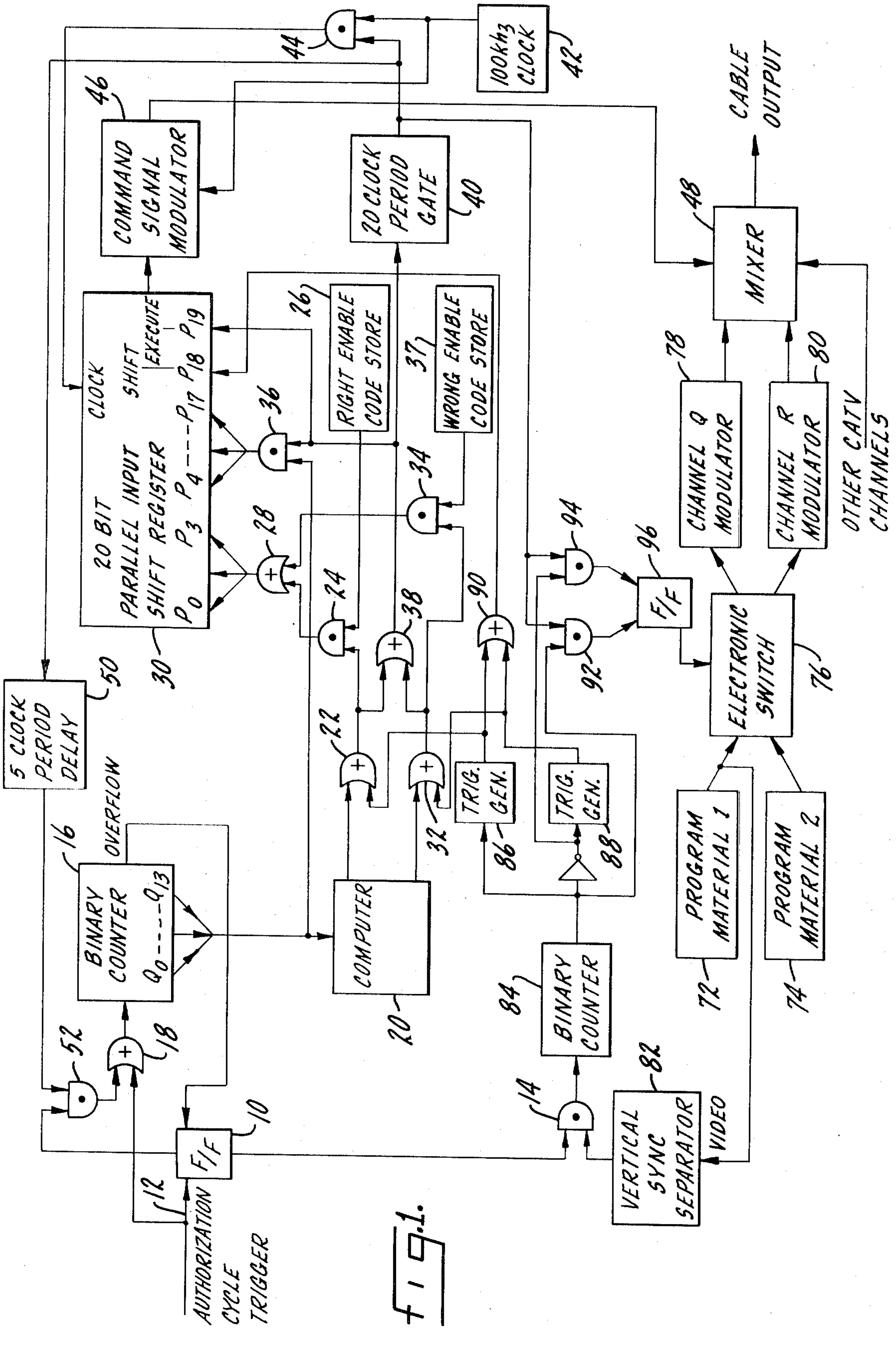
FIG. 1 is a diagrammatic illustration of the transmitting end of a subscriber television system.

In FIG. 1 a conventional flip-flop is indicated at 10 and will receive an authorization cycle trigger from input 12. When the flip-flop 10 receives an authorization signal it will change states, placing an inhibiting signal on the channel switching operation, to be described hereinafter, by means of and gate 14. A binary counter is indicated at 16 and may be a 14-bit binary counter which can provide 16,000 subscriber addresses as described above. Normally the counter 16 will have all of its 14 "Q" outputs in the zero condition. The authorization trigger coupled directly through or gate 18 will cause the counter to go to a condition of 00000000000001, which corresponds to a particular subscriber address. The output of the binary counter 16 is coupled to a computer 20 which has stored in its memory the authorization or lack of authorization of each subscriber for a particular program. When an authorized address is received by the computer 20, it will cause an authorization trigger to be sent from the computer to or gate 22. The signal from or gate 22 is coupled to an and gate 24 which also receives a 4 bit enable code from a "right enable code store" 26. The output from and gate 24 goes to an or gate 28 which then stores an enabling code in the 20-bit shift register 30. And gate 24 and or gate 28 are each 4 parallel gates but are shown singly for simplification. Preferably the enabling code will be in inputs P0 through P3 of the shift register 30.

When an unauthorized address is received by the computer 20, a trigger is provided for or gate 32 which in turn is coupled to and gate 34 with and gate 34 being coupled to a "wrong enable code store" 37. The output from and gate 34 also provides an enabling code for the shift register 30 through gate 28. Thus, for each address there will either be a right enable code or a wrong enable code, depending upon the programming of the computer 20.

Each address from the counter 16 is coupled through and gate 36 to the shift register 30 at inputs P4 through P17. Thus, for each address there will be an address code stored in the shift register and an enabling code. The output from either or gate 22 or or gate 32 provides a trigger for or gate 38 which will enable and gage 36 to store the address in the shift register 30. And gate 36 is actually 14 parallel and gates but is shown singly for simplification. The output from or gate 38 is also stored in the shift register as an execute signal on input P19. P19 will be the first of the pulses transmitted from the parallel input shift register 30 as the pulses will be transmitted in a serial manner to the serial input at each subscriber location. At this point the parallel input shift register 30 has an address code, an execute signal, and an enabling code all stored. In addition to its other functions, or gate 38 also starts the 20 clock period gate 40. The gate 40 will couple the 100 Khz clock 42 through and gate 44 to the shift register 30 clock input causing the stored information in the shift register to be serially transferred to the command signal modulator 46. The output of the command signal modulator 46 is a radio frequency carrier modulated simultaneously by the pulse train output of shift register 30 and the 100 Khz clock 42. Techniques for accomplishing this modulation are well known. The output of the command signal modulator 46 is transmitted into the cable via mixer 48.

As indicated above, address signals, each made up as described are sequentially transmitted over the cable, to each of the subscriber locations. Every subscriber will receive either a correct or an incorrect enabling signal, depending upon the programming of the computer 20.

The trailing edge of the signal from gate 40 is delayed five clock periods by delay 50 and then coupled through and gate 52 and or gate 18 to advance the counter one count. Thus, there is a delay period of five clock signals between successive authorization signals. The addressing and authorization cycle will continue until there is an overflow output from the counter 16 which resets flip-flop 10 to indicate the completion of the authorization cycle. At this time counter 16 will have returned to an all zero output and the authorization mode is completed and the switching mode is automatically started.

Figure 2:
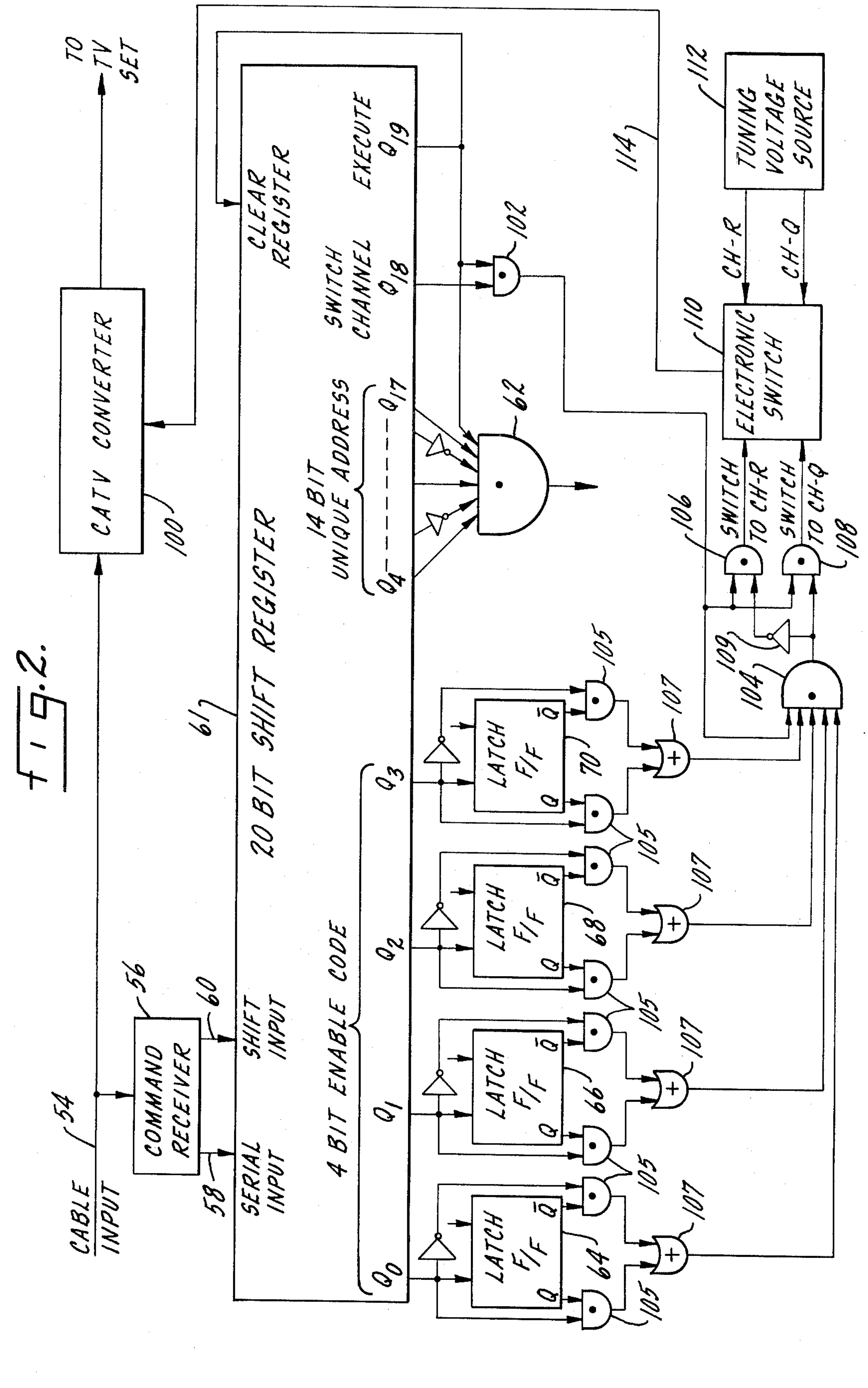
FIG. 2 is a diagrammatic illustration of a subscriber location in the subscription television system described.

Turning to FIG. 2, the input subscriber cable is indicated at 54 and the incoming authorization signals go to a command receiver 56. There are two outputs from the receiver 56 to a 20-bit shift register 61, one for the information pulse train, being indicated at 58, and the other for the clock signal, being indicated at 60. The shift register outputs Q4 through Q17, providing the address, are all connected to an and gate 62. And gate 62 also receives an execute signal from output Q19. Thus, there will be an output from gate 62 caused by the simultaneous presence of a particular subscriber address code and an execute signal from output Q19. The output from and gate 62 is used as a strobe signal and is applied to the one input of the four latching flip-flops indicated at 64, 66, 68 and 70. The latching flip-flops 64–70 will store the four-bit enable code with was sent out with the particular subscriber address code and which is present at outputs Q0 through Q3 of the 20-bit shift register 61. If the particular subscriber is an unauthorized one, the wrong enable code may be stored. Thus, at the end of the authorization signal an enable code is stored in latching flip-flops 64-70 and the particular subscriber location is ready to receive programming.

Returning to FIG. 1, program signals may be supplied from either program material supply 72 or program material supply 74 one or both of which may provide useful television signals. Program material supply 72 will always supply a useful television signal. Program material supply 74 may also supply a useful television signal provided that the vertical sync is coincident with program material supply 72. If not, program material supply 74 may be used as a scrambling signal consisting of incorrectly timed sync signals and a loud irritating audio signal. Both program material supplies 72 and 74 are connected to an electronic switch 76. The switch 76 is connected to channel modulators 78 and 80, with channel modulator 78 being for channel Q and channel modulator 80 being for channel R. These are merely illustrative examples and the invention obviously should not be limited to the use of these particular channels. The channel modulators 78 and 80 are connected to the mixer 48 which then provides the output signal for the cable. As indicated, other television channels may also provide signals for the mixer 48 for transmission on the cable.

A portion of the video signal taken from program material supply 72 drives a vertical sync separator 82 which provides an input for and gate 14. Thus, when the inhibit signal is removed by flip-flop 10 in returning to its original condition, each vertical symch signal will cause an output from and gate 14 to a binary counter 84. The binary counter 84 has an output or changes states after a predetermined number of vertical sync pulses, for example four. An output is provided from trigger generator 86 every time counter 84 changes to one condition and an output is provided from trigger generator 88 every time the counter 84 changes to the opposite condition. The output from trigger generators 86 and 88 are combined in an or gate 90 which provides a shift signal at input P18 of the shift register 30. Thus, every time counter 84 changes state, indicative of four vertical sync pulses having transpired, a shift signal will be stored in the shift register 30.

The output from trigger generators 86 and 88 are in parallel with the outputs from the computer 20 through or gates 22 and 32. Thus in the same manner that an output from the computer 20 caused a series of signals to the enable inputs of the shift register 30, the signals from or gates 22 and 32 caused by a change in the condition of trigger generators 86 and 88 will cause an enable input to the shift register. Thus, in the channel switching mode, an enable code, a channel switching command and an execute signal are all stored in the shift registered and transmitted. However, there is no address transmitted and hence the channel switching signal need only be sent once and does not have to be repetitive as was the case in the authorization mode.

The trailing edge of the signal from clock gate 40 is coupled to and gates 92 and 94, which also receive inputs from the binary counter 84. Depending upon the state of counter 84, there will be an input to either side of flip-flop 96 which is connected to the and gates 92 and 94. Each time flip-flop 96 changes condition, the state of electronic switch 76 will change and the carrier frequency of program material supply 72 will alternate between channel Q (channel modulator 78) and channel R (channel modulator 80). The output of program material supply 74 will be simultaneously switched to the opposite modulator (78 or 80). This change in the carrier frequency will coincide with the last bit of the channel switching command being transmitted as described above. Accordingly, the subscriber-decoder will switch simultaneously. Normally, the channel switching mode, as described above, will continue until a new authorization cycle trigger is supplied. Such an authorization cycle trigger may be applied periodically during the program to make sure that the system is secure.

The television signal from mixer 48 along with the command signal for channel switching will be received at each subscriber location, by the command receiver 56 and the CATV converter 100. The CATV converter 100 can selectively convert any one of a multiplicity of television channel frequencies at its input to a single predetermined television channel frequency at its output. The input television channel frequency to be converted is determined by a tuning voltage applied to one or more voltage variable capacitors in the converter. The tuning voltage is normally controlled by a channel selector switch. The channel selector switch has one or more positions to select coded channels and in this case the tuning voltage is controlled by the decoder. From the converter, which will be controlled as described hereinafter, the television signal will be directed to a conventional television set. The invention is useful in a cable television subscription system, although certainly the channel switching functions may be useful in an on-air type of system which may or may not need a converter.

In FIG. 2 the simultaneous presence of a switch channel signal (Q18) and an execute signal (Q19) at the output of shift register 61 will cause an output from and gate 102. The output from and gate 102 is connected to an and gate 104 which has similar inputs from the latching flip-flops 64–70 through and gates 105 and or gates 107. There will be inputs to and gate 104 from each of the latching flip-flops if the enable code sent with the channel switching command matched the stored enable code in the flip-flops. There will be an output from and gate 104 to and gate 108 if the received enable code matches the stored enable code. If the codes do not match, and gate 104 supplies an input to and gate 106 via inverter 109. The outputs from and gates 106 and 108 supply channel switching commands to electronic switch 110.

A source of tuning voltage is indicated at 112 and it provides a voltage for tuning either channel Q or channel R to the switch 110. The output from switch 110 will direct the proper tuning voltage via line 114 to the converter 100. Thus, assuming an appropriate enable signal as a part of the channel switching command, either and gate 106 (channel R) or and gate 108 (channel Q) will cause the electronic switch 110 to switch to the appropriate channel. It is intended that decoder operation will normally permit viewing of program material 72 (FIG. 1). However, if a means is provided to invert the channel switching command inputs to electronic switch 110, program material 74 (FIG. 1) may be viewed.

In the example given, an incorrect enable code was sent to unauthorized subscribers. In another method of operation, no address code would be transmitted to unauthorized subscribers.

In one application of the invention the enable code may be changed periodically during a particular program, whereas, in other uses the enable code may remain the same for a prolonged period, for example the length of a particular program.

Of importance is the fact that the channel switching commands are sent during the vertical blanking interval so that there is no interruption of the program. The initial authorization cycle must precede the start of a coded program. Channel switching operation will cease for the duration of subsequent authorization cycles but no interruption of service will be apparent to authorized subscribers. The channel switching commands, as they do not contain an address, do not have to be repetitive, and the entire message can easily be sent during the vertical blanking interval.

When the system described is used in a cable television system, the subscriber decoder may be packaged as a part of the CATV converter.

In the example given, two sources of program material were coded by switching between two television channels. It should be apparent that this may be expanded to three or more sources of program material being switched between three or more television channels. In this case, the message length may be increased to allow independent enable coding and switching commands for each coded channel.

The system described is a one way system in that all signals originate at the transmitting end. A more sophisticated system could include means for transmitting messages back from individual subscribers to the distribution center. The information contained in these return signals could be, for example, a request for authorization to decode, audience polling replies or emergency alarms. These return signals may take the form of a pulse train modulated on a radio frequency carrier. The receipt, by a particular subscriber decoder, of its address code would be used to trigger a return signal. In this fashion, return signals from subscribers will be sequential and identifiable at the distribution center.

Whereas the preferred form of the invention has been shown and described herein, it should be realized that there may be many modifications, substitutions and alterations thereto.

I claim:

1. A subscriber television system in which television signals are sent from a transmitting center to a plurality of subscribers, means at the transmitting center for sending an enabling signal to predetermined subscribers, means at each subscriber location for receiving and storing said enabling signals, means at the transmitting center for switching a television signal between different channels, means at the transmitting center for sending a channel switching signal including an enabling signal to the predetermined subscribers, means at each subscriber location for comparing enabling signals, and means at each subscriber's location for using the comparision between enabling signals for synchronizing switching between said different channels at the transmitting center and subscriber locations to provide useful TV signals at said predetermined subscribers.

2. The system of claim 1 further characterized by means for switching channels during the vertical blanking interval of the video signal.

3. The system of claim 1 further characterized in that the first mentioned enabling signal includes an address portion, there being a different address for each of the predetermined subscribers.

4. The system of claim 3 further characterized by and including means at the transmitting center for sending a plurality of enabling signals to said predetermined subscribers prior to sending the channel switching signals.

5. The system of claim 1 further characterized by timing means at the transmitting center for controlling the periodic switching of channels.

6. The system of claim 1 further characterized by means for transmitting said channel switching signals during the vertical blanking interval of the television signal.

7. A method of coding and decoding television signals in a subscription television system including the steps of a. sending an enabling signal from a transmitting center to predetermined subscribers, b. using the enabling signal at each subscriber location to place signal decoding means in a readiness condition, c. coding the TV signal sent from the transmitting center and simultaneously therewith sending a decoding signal to each subscriber location, d. using the decoding signals at the enabled subscriber locations to convert the coded TV signal into a useful TV signal.

8. The method of claim 7 further characterized in that the decoding signal to the subscriber locations is transmitting during the vertical blanking interval of the video signal.

9. The method of claim 7 further characterized in that each enabling signal includes an enabling portion and an address peculiar to a single subscriber location.

10. The method of claim 7 further characterized in that the coding and decoding of the TV signals consists in switching the video carrier from one television channel to another at periodic intervals.

11. The method of claim 10 further characterized in that the decoding signal is coordinated with channel switching to provide a video carrier channel switching function at subscriber locations coincidental with the switching function at the transmitting center.

12. The method of claim 7 further characterized in that the decoding signals include an enabling portion, with the further step of comparing the first mentioned enabling signal and the enabling portion of the decoding signal, and using said comparison to convert the coded TV signal into a useful TV signal.

* * * * *

REEXAMINATION CERTIFICATE (840th)

United States Patent [19]

Harney

[11] B1 3,789,131

[45] Certificate Issued Apr. 26, 1988

[54] SELECTIVE CODING SYSTEM FOR SUBSCRIPTION TELEVISION

[75] Inventor: Ralph P. Harney, Wonder Lake, Ill.

[73] Assignee: Oak Industries Inc., Crystal Lake, Ill.

Reexamination Request:
No. 90/001,234, May 1, 1987

Reexamination Certificate for:

| | |
|---|---|
| Patent No.: | **3,789,131** |
| Issued: | **Jan. 29, 1974** |
| Appl. No.: | **2,77,,790** |
| Filed: | **Aug. 3, 1972** |

[51] Int. Cl.[4] .............................................. H04N 7/167

[52] U.S. Cl. ........................................ 380/13; 380/20; 380/31; 380/34; 455/4

[58] Field of Search ........................ 380/10, 13, 20, 33, 380/34, 31; 455/4

[56] References Cited

U.S. PATENT DOCUMENTS

| | | | |
|---|---|---|---|
| 2,619,530 | 11/1952 | Roschke . | |
| 2,656,405 | 10/1953 | Roschke et al. | 178/5.1 |
| 2,656,410 | 10/1953 | Herrick et al. | 178/5.1 |
| 2,833,850 | 5/1958 | Bartelink | 178/5.1 |
| 3,011,016 | 11/1961 | Roschke | 178/5.1 |
| 3,054,857 | 9/1962 | Weiss . | |
| 3,242,258 | 3/1966 | Salit et al. | 178/5.1 |
| 3,538,243 | 11/1970 | Shanahan et al. | 178/5.1 |
| 3,668,307 | 6/1972 | Face et al. | 178/5.6 |
| 3,684,823 | 8/1972 | McVoy . | |
| 3,716,654 | 2/1973 | Hendrickson et al. . | |
| 3,733,430 | 5/1973 | Thompson et al. | 178/5.1 |
| 3,733,431 | 5/1973 | Kirk, Jr. et al. . | |
| 3,757,225 | 9/1973 | Ulicki | 325/308 |
| 3,777,053 | 12/1973 | Wittig et al. | 178/5.1 |
| 3,790,700 | 2/1974 | Callais et al. | 178/5.1 |
| 3,833,757 | 9/1974 | Kirk, Jr. et al. | 178/5.6 |
| 3,836,888 | 9/1974 | Boenke et al. | 340/172.5 |
| 3,899,633 | 8/1975 | Sorenson et al. | 178/5.1 |

OTHER PUBLICATIONS

"Detailed Specifications of Zenith Radio Corporation's Phonevision system of subscription television," Jul. 25, 1966, FCC Docket No. 11279.

"Pilot Projects for the Broadband Communications Distribution System," Malarkey-Taylor & Associates, Nov., 1971.

"20th Annual NCTA Convention Official Transcript," National Cable Television Association, Jul. 6-9, 1971.

"Scientific American," Jul., 1966, pp. 38-46 (article by D. Kahn, Modern Cryptology).

"Electronics" magazine, Sep. 27, 1971 issue, pp. 54-55 (article by D. Chandler).

"IEEE Transaction on Broadcasting," vol. BC-17, No. 3, Sep. 1971, pp. 77-82 (article by T. Anderson).

"Journal of SMPTE," vol. 80, Nov., 1971, pp. 889-895 (Session Synopses and Panel Discussion).

*Primary Examiner*—S. C. Buczinski

[57] ABSTRACT

A system for coding and decoding television signals in a subscription television system provides means for alternately switching a television signal between channels at a transmitting center and for providing channel switching signals simultaneously therewith to each subscriber location to coordinate channel switching at the subscriber location. Prior to channel switching, those subscribers to receive the subscription program receive an enabling signal so that the channel switching signals will only be effective to control channel switching at the selected subscriber locations.

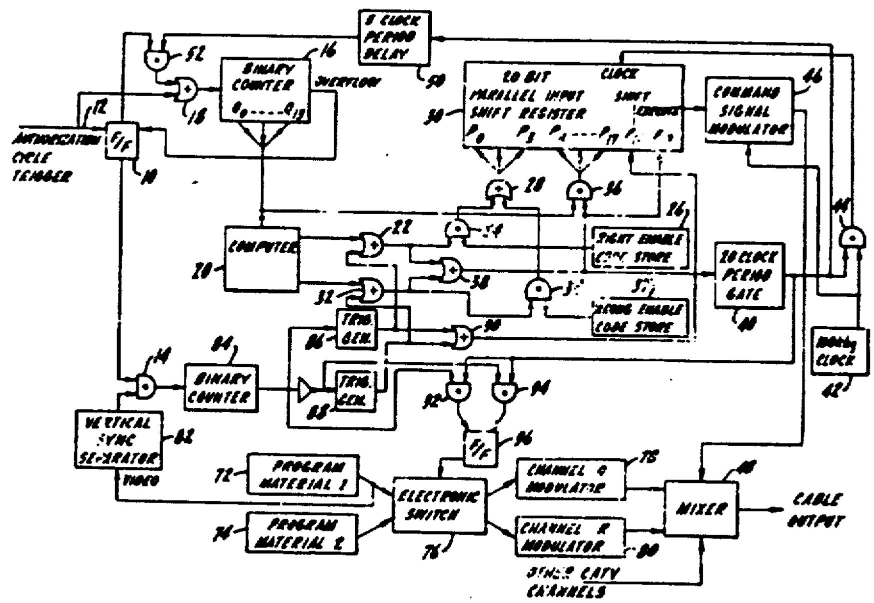

REEXAMINATION CERTIFICATE ISSUED UNDER 35 U.S.C. 307

THE PATENT IS HEREBY AMENDED AS INDICATED BELOW.

Matter enclosed in heavy [ ] brackets appeared in the patent, but has been deleted and is no longer a part of the patent; matter printer in italics indicates additions made to the patent.

AS A RESULT OF REEXAMINATION, IT HAS BEEN DETERMINED THAT:

Claims 1–6, 9 and 12 are cancelled.

Claim 7 is determined to be patentable as amended.

Claims 8, 10 and 11, dependent on an amended claim, are determined to be patentable.

New claim 13 is added and determined to be patentable.

7. A method of coding and decoding television signals in a subscription television system including the steps of a. [sending] *electronically transmitting over such subscription television system on a radio frequency carrier* an enabling *code* signal from a transmitting center to predetermined subscribers, *each enabling code signal including an enabling code portion and an address code portion peculiar to a single subscriber location,* b. using the enabling *code* signal at each *predetermined* subscriber location to place signal decoding means in a *preauthorized* readiness condition *by storing the enabling code portion,* c. coding the TV signal [sent] *transmitted* from the transmitting center and simultaneously therewith [sending] *electronically transmitting over such subscription television system on a radio frequency carrier* a decoding signal to each subscriber location, *the*

*decoding signals including an enabling code portion and a decoding portion,* d. using the decoding signals at the [enabled] subscriber locations *having decoding means which have been placed in a preauthorized readiness condition by comparing the first mentioned enabling code portion and the enabling code portion of the decoding signal, and using said comparison and the decoding portion of the decoding signal* to convert the coded TV signal into a useful TV signal.

*13. A method of coding and decoding television signals in a subscription television system including the steps of:*

*a. electronically transmitting over such subscription television system on a radio frequency carrier from a television transmitting center an enabling signal to predetermined subscribers, the transmitted enabling signal including a digital address portion correspondiong to a unique address contained in a particular subscriber's decoder and a digital authorization code;*

*b. storing the digital authorization code in a subscriber's decoder's authorization code memory upon, and only upon, the correspondence between the subscriber's decoder's unique address and the address portion of a transmitted enabling signal;*

*c. coding a television signal electronically transmitted to all subscribers from the television transmitting center and simultaneously with the transmission of the coded television signal electronically transmitting over such subscription television system on a radio frequency carrier to all subscribers a decoding signal, which decoding signal includes a decoding digital authorization code and decoding information;*

*d. at each subscriber's location receiving the electronically transmitted television signal and decoding signal simultaneously, comparing the data stored in the subscriber's decoder's authorization code memory with the decoding authorization code contained in the decoding signal, and using the comparison between the data stored in the decoder's authorization code memory and the received decoding authorization code to allow the decoding information in the decoding signal to convert the coded TV signal into a useful TV signal.*

* * * * *